(12) United States Patent
Wells et al.

(10) Patent No.: US 8,764,034 B2
(45) Date of Patent: Jul. 1, 2014

(54) STEERING AXLE ASSEMBLY WITH SELF-LUBRICATED BEARINGS

(71) Applicant: Roller Bearing Company America, Inc., Oxford, CT (US)

(72) Inventors: David Wells, Shawnee, OK (US); Gregg L. Hamel, Plantsville, CT (US); Bradley Smith, New Britain, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 13/945,575

(22) Filed: Jul. 18, 2013

(65) Prior Publication Data
US 2014/0035247 A1  Feb. 6, 2014

Related U.S. Application Data

(60) Provisional application No. 61/676,406, filed on Jul. 27, 2012.

(51) Int. Cl.
*B62D 7/16* (2006.01)

(52) U.S. Cl.
USPC .............................. 280/93.511; 280/93.512

(58) Field of Classification Search
USPC .............................. 280/93.51, 93.511, 93.512
See application file for complete search history.

(56) References Cited

U.S. PATENT DOCUMENTS

| 1,923,892 | A |   | 8/1933  | Skillman          |            |
|-----------|---|---|---------|-------------------|------------|
| 2,488,979 | A |   | 11/1949 | Kogstrom          |            |
| 3,288,485 | A |   | 11/1966 | White et al.      |            |
| 3,294,413 | A | * | 12/1966 | Jurosek et al.    | 280/93.512 |
| 3,300,230 | A | * | 1/1967  | Spencer           | 280/93.512 |
| 3,384,428 | A |   | 5/1968  | Hodge             |            |
| 3,438,647 | A |   | 4/1969  | Fraboni et al.    |            |
| 3,441,288 | A | * | 4/1969  | Boughner          | 280/93.512 |
| 3,783,966 | A |   | 1/1974  | Campbell et al.   |            |
| 4,229,017 | A |   | 10/1980 | Hagedorn          |            |
| 4,286,799 | A |   | 9/1981  | Ayres             |            |
| 4,336,953 | A |   | 6/1982  | Low               |            |
| 4,635,952 | A |   | 1/1987  | Smith             |            |

(Continued)

FOREIGN PATENT DOCUMENTS

| DE | 9214393 U1   | 12/1992 |
|----|--------------|---------|
| WO | 97/49597     | 12/1997 |
| WO | 02/102642 A1 | 12/2002 |

OTHER PUBLICATIONS

International Search Report for PCT/US2013/051098, dated Dec. 5, 2013.

*Primary Examiner* — Toan To
(74) *Attorney, Agent, or Firm* — MKG, LLC

(57) ABSTRACT

A steering axle assembly includes a wheel end having a knuckle section comprising a first arm and a second arm each extending therefrom. The steering axle assembly includes an axle beam having a connecting end. A pin is disposed in respective bores of the first and second arms and of the connecting end. The steering axle assembly includes a self-lubricated bearing system that including a first tubular bushing, a second tubular busing and an annular thrust bearing. The self-lubricated bearing system has an adequate amount of lubricant therein at a beginning of life state and the amount of the lubricant being sufficient for an end of life state defined by at least one million miles of operation of the heavy duty truck, without replenishment of the lubricant.

11 Claims, 15 Drawing Sheets

(56) References Cited

U.S. PATENT DOCUMENTS

| | | | |
|---|---|---|---|
| 4,690,418 A * | 9/1987 | Smith | 280/93.512 |
| 5,104,138 A | 4/1992 | Allen | |
| 5,413,365 A | 5/1995 | Bodin et al. | |
| 5,439,244 A | 8/1995 | Tomosada et al. | |
| 5,975,547 A | 11/1999 | Stroh et al. | |
| 6,217,046 B1 | 4/2001 | Bodin et al. | |
| 6,293,022 B1 * | 9/2001 | Chino et al. | 33/203.18 |
| 6,499,752 B1 | 12/2002 | Davis | |
| 6,607,203 B2 | 8/2003 | Bodin | |
| 6,612,390 B2 * | 9/2003 | Bennett et al. | 180/254 |
| 6,932,373 B2 | 8/2005 | Seebohm et al. | |
| 7,093,843 B2 | 8/2006 | Varela et al. | |
| 7,097,184 B2 | 8/2006 | Kapaan et al. | |
| 7,520,515 B2 | 4/2009 | Richardson | |
| 7,980,571 B2 | 7/2011 | Chalin et al. | |
| 8,070,177 B2 | 12/2011 | Eveley | |
| 8,272,649 B2 | 9/2012 | Kurth et al. | |
| 2003/0062701 A1 | 4/2003 | Davis | |
| 2003/0127828 A1 | 7/2003 | Seebohm et al. | |
| 2003/0222422 A1 | 12/2003 | Barila | |
| 2004/0207170 A1 | 10/2004 | Kapaan et al. | |
| 2004/0232641 A1 | 11/2004 | Kaiser | |
| 2005/0151338 A1 | 7/2005 | Bodin | |
| 2008/0164670 A1 | 7/2008 | Ziech | |
| 2011/0135232 A1 | 6/2011 | Hagan | |
| 2014/0035247 A1 * | 2/2014 | Wells et al. | 280/93.512 |

* cited by examiner

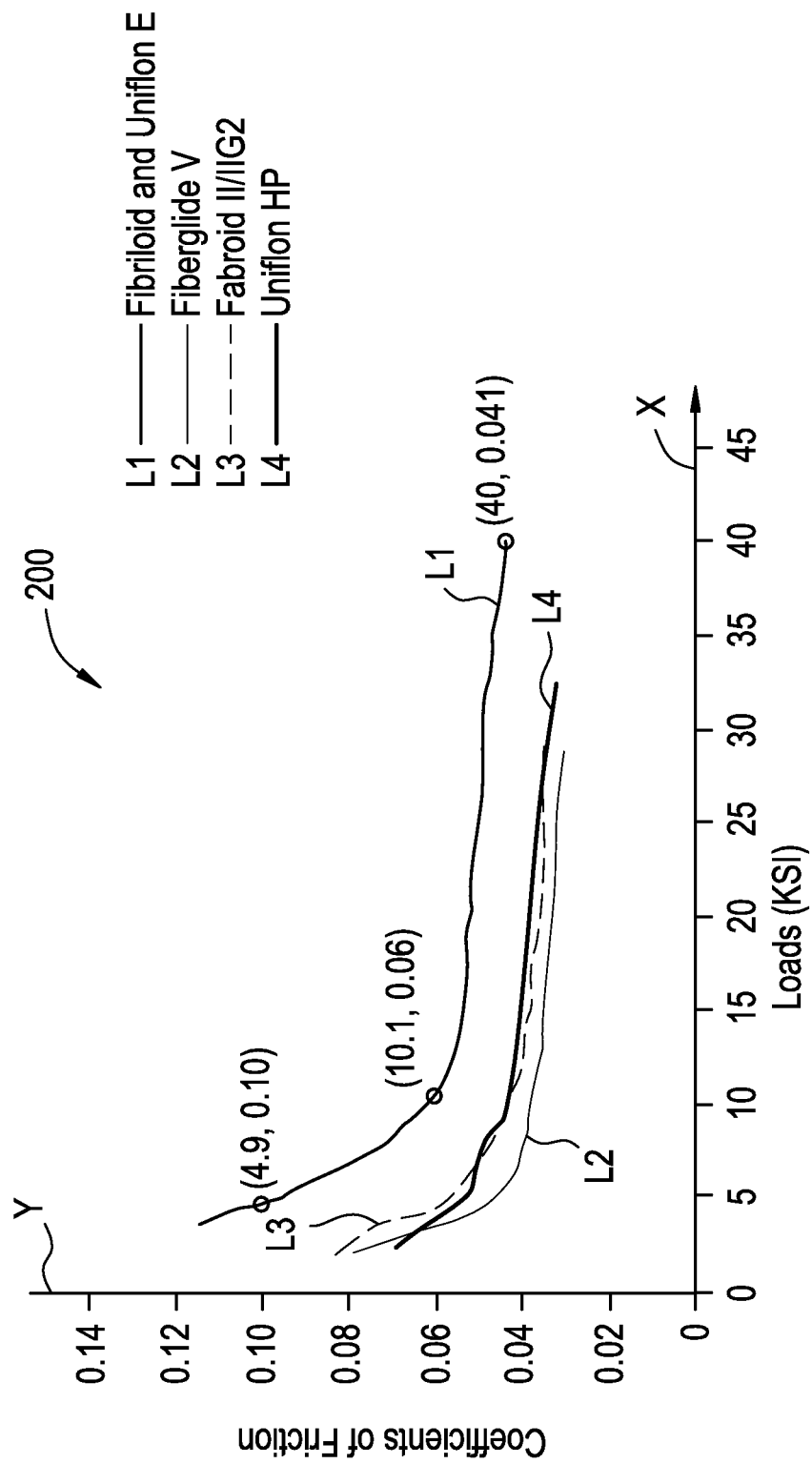

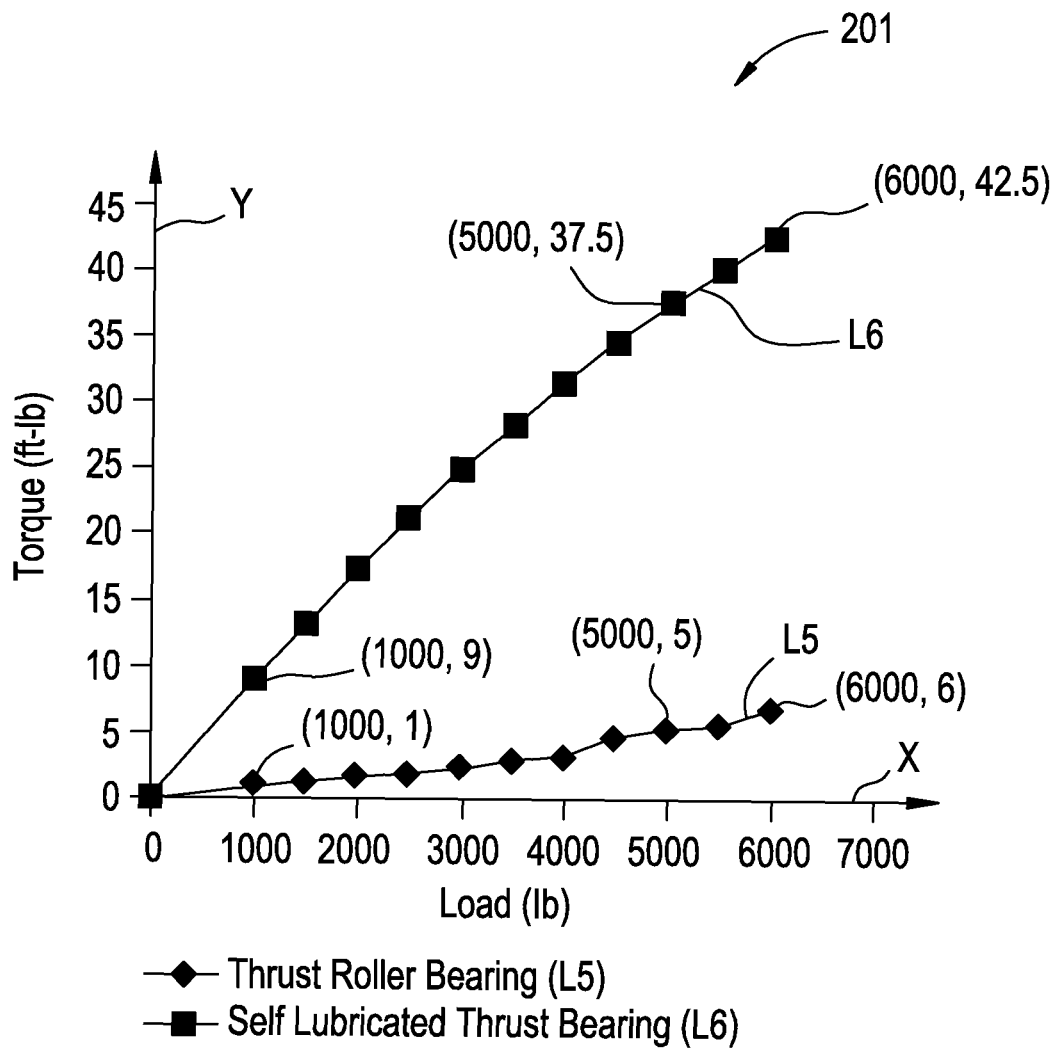

STEERING AXLE ASSEMBLY WITH SELF-LUBRICATED BEARINGS

CROSS REFERENCE TO RELATED APPLICATIONS

This application claims the benefit of U.S. Provisional Patent Application No. 61/676,406 titled "Steering Axle Assembly with Self-Lubricating Bearings" filed on Jul. 27, 2012, the contents of which are incorporated herein by reference in their entirety.

FIELD OF THE INVENTION

The present invention is directed toward a steering axle assembly for a truck and is more particularly directed to a king pin assembly having one or more self-lubricated sleeve bushings and/or a thrust bearing assembly having a self-lubricated member disposed therein that do not require adding any lubrication for over one million miles of operation of the truck.

BACKGROUND

In the United States trucks are classified according to their Gross Vehicle Weight Rating (GVWR). For example, Classes 1 through 8 covers trucks with GVWRs up to 33,000 pounds. Such trucks include a steering axle assembly mounted to a frame portion of the truck. The steering axle assembly provides a means of pivotally controlling the front wheels of the truck for steering the truck.

Typically, the steering axle assemblies includes a king pin assembly which is a pivotal connector between the wheel end and an axle beam. The axle beam is mounted to the frame and the wheel end provides a mounting area for rotatingly mounting the wheels to the wheel end. The king pin assembly also includes a knuckle which defines a pair of opposing arms extending from a body portion of the knuckle in a C-shaped configuration. A distal end of each of the arms includes a first bore extending therethrough. A connecting end of the axle beam has a second bore extending therethrough. The connecting end of the axle beam is positioned between the opposing arms such that the first and second bores are aligned about a common axis. A king pin is disposed in the first and second bores. The king pin is pinned to the connecting end of the axle beam. The wheel end and knuckle is pivotable with respect to the king pin.

Certain types of king pin assemblies include a thrust bearing mounted between one or both of the arms and an opposing surface of the connecting end of the axle beam. In addition, a bushing such as a sleeve bushing is typically positioned in the first bore with the king pin positioned in an internal area of the sleeve. Grease fittings such as Zerk fittings are typically provided in the connecting end of the axle beam and/or the arms of the knuckle to provide a path for introduction of lubricants such as grease into the thrust bearing and/or the sleeve.

The thrust bearings and sleeves can be exposed to contaminants such as dirt, sand and salt, which can degrade and wear the thrust bearings and sleeves. However, lubrication, overhaul, maintenance and replacement of king pin assemblies is time consuming, difficult and expensive. Use of seals installed on the thrust bearings and sleeves have been unsuccessful in stopping the ingress of contaminants therein and egress of lubricants therefrom.

For decades, those skilled in the relevant art have sought after a king-pin assembly that requires no maintenance for the duration of the life of the king pin assemblies, which is typically one million miles. However, such a maintenance-free king pin assembly has not been achieved. Design of king pin assemblies involves a delicate balance and tradeoffs between friction and wear resistance. Those skilled in the relevant art have found that while roller bearings have relatively low operating torque, they can have shortened life, because proper lubrication is often not maintained. When a roller bearing is properly lubricated it will have insignificant wear. However, if the roller bearing experiences high loads, it can suffer for surface fatigue, referred to as spalling. On the other hand, self-lubricated materials are known to have a high load capacity but operate at a higher torque than comparable roller bearings. In addition, self-lubricated bearing materials tend to wear with use. Thus those skilled in the relevant art have been discouraged from using self-lubricated materials in bearings for steering systems because of the potential for bearing wear which can cause steering system lashing and also driver discomfort and dissatisfaction with the steering system operation. For example, one symptom of such wear would be the wheels inappropriately returning to the center.

SUMMARY OF THE INVENTION

According to aspects illustrated herein, there is provided a steering axle assembly for a heavy duty truck (i.e., Class 4 to 8). The steering axle assembly includes a wheel end having a knuckle section including a first arm and a second arm each extending from the knuckle section. The first arm has a first interior surface that defines a first bore extending between a first exterior axial end surface and a first interior axial end surface. The second arm has a second interior surface that defines a second bore extending between a second exterior axial end surface and a second interior axial end surface. The steering axle assembly includes an axle beam that has a connecting end. The connecting end has a third interior surface that defines a third bore extending between a third axial end surface and a fourth axial end surface. The steering axle assembly includes a pin having a cylindrical exterior surface. The pin is disposed in and is coaxial with the first bore, the second bore and the third bore. The steering axle assembly includes a self-lubricated bearing system that includes a first tubular bushing, a second tubular busing and an annular thrust bearing. The first tubular bushing is positioned in the first bore and engages the first interior surface and a portion of the cylindrical exterior surface of the pin. The second tubular bushing is positioned in the second bore and engages the second interior surface and a portion of the cylindrical exterior surface of the pin. The annular thrust bearing assembly is disposed between the first interior axial end surface and the third axial end surface. The annular thrust bearing assembly has a first plate in rotational communication with a second plate. The self-lubricated bearing system has an adequate amount of lubricant therein at a beginning of life state. The amount of the lubricant at the beginning of life state is sufficient to last to an end of life state defined by at least one million miles of operation of the heavy duty truck, without replenishment of the lubricant.

In one embodiment, the annular thrust bearing assembly includes a thrust bearing disposed between and slidingly engaging the first plate and the second plate. One or more of the first tubular bushing, the second tubular bushing and the thrust bearing are manufactured from a self-lubricated material.

In one embodiment, the annular thrust bearing assembly consists of a sealed thrust bearing assembly having a plurality of rolling elements disposed between and rollingly engaging the first plate and the second plate

BRIEF DESCRIPTION OF THE DRAWINGS

FIG. 13 is a graph of coefficient of friction versus load for four self-lubricated materials;

FIG. 14 is a graph of running torque versus load for a thrust bearing having a self-lubricated thrust bearing and for a roller type thrust bearing;

DETAILED DESCRIPTION OF THE DRAWINGS

Figure 1:
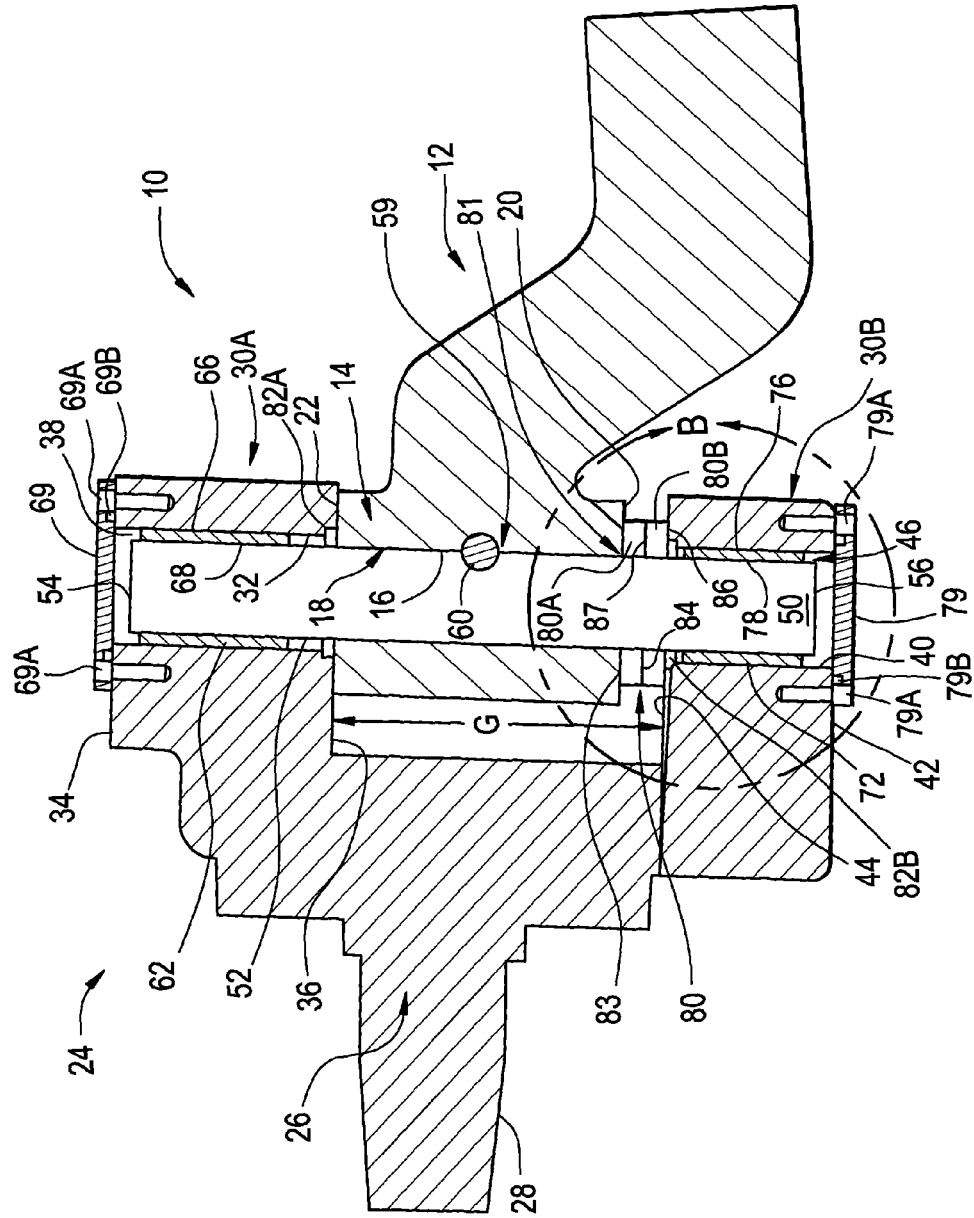
FIG. 1 is a cross sectional plan view of a portion of a truck axle assembly having a thrust bearing assembly of the present invention.
Figure 2:
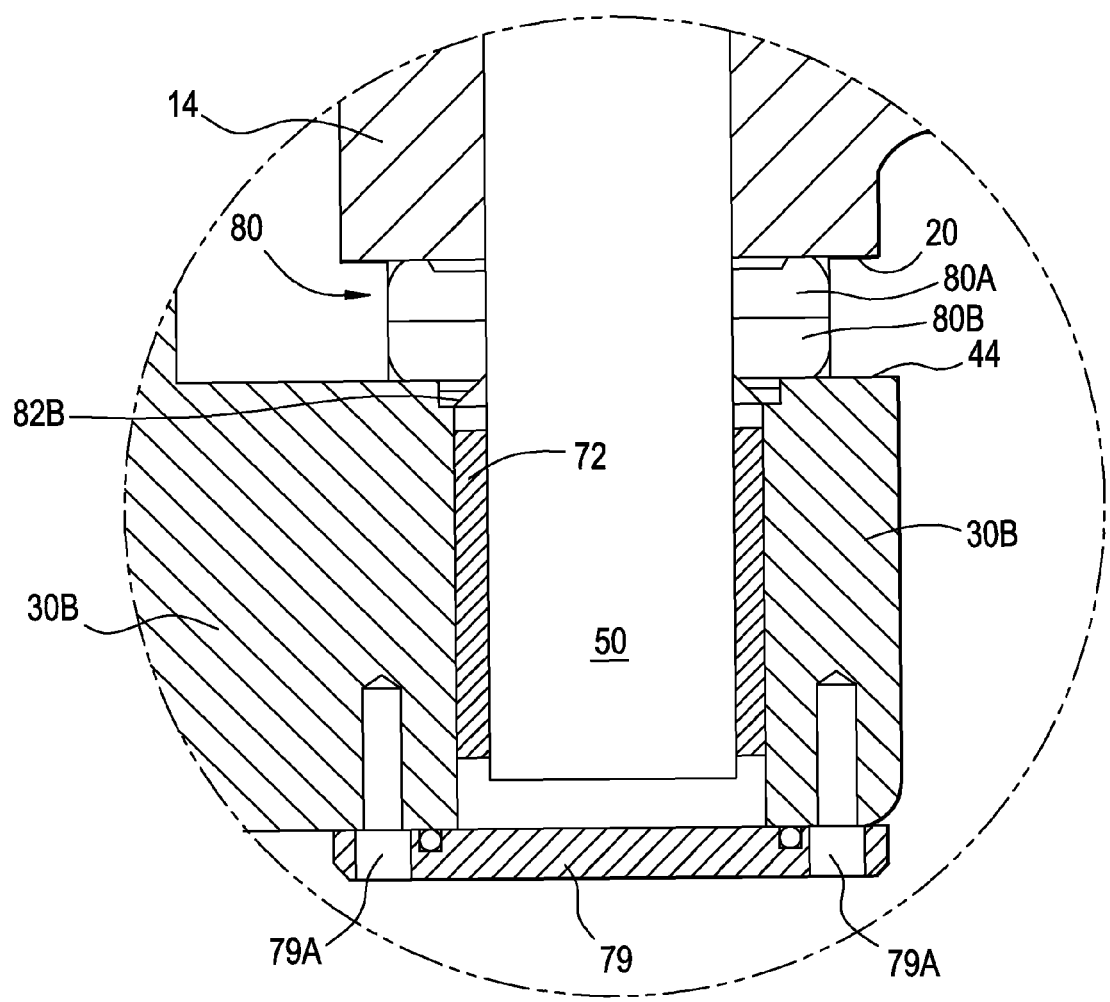
FIG. 2 is an enlarged cross sectional view of a portion B of the truck axle assembly of FIG. 1.

As shown in FIG. 1 a portion of a truck axle assembly for Classes 4 through 8 heavy duty trucks is generally referred to herein as a king pin assembly 10. The king pin assembly 10 includes an axle beam 12 connected to a truck frame (not shown). The axle beam 12 defines a connecting end 14 formed on one end thereof. The connecting end 14 has a generally cylindrical interior surface 16 defining a first bore 18 extending between a first axial end surface 20 and a second axial end surface 22. The king pin assembly 10 includes a wheel end portion 24 which defines a knuckle section 26. The knuckle section 26 has a spindle 28 extending outwardly therefrom in a first direction, for rotatably mounting a wheel (not shown) thereon. The knuckle section 26 also has a first arm 30A and a second arm 30B extending from the knuckle section 26 in a second direction generally opposite the first direction. The first arm 30A and the second arm 30B are spaced apart from one another in a generally C-shaped configuration and form a gap G therebetween.

The first arm 30A has a generally cylindrical interior surface 32 that extends between a first exterior axial end surface 34 and first interior axial end surface 36. The interior surface 32 defines a second bore 38. The second arm 30B has a generally cylindrical interior surface 40 that extends between a second exterior axial end surface 42 and second interior axial end surface 44. The interior surface 40 defines a third bore 46.

The king pin assembly 10 includes a pin 50 (e.g., a king pin) having a generally cylindrical exterior surface 52 extending between a first axial end 54 and a second axial end 56 of the pin. The pin 50 is disposed in and is coaxial with the first bore 18, the second bore 38 and the third bore 46. A central portion 59 of the pin 50 is secured in the first bore 18 of the connecting end 14 by a stake 60.

The king pin assembly 10 includes a self-lubricated bearing system defined by a first tubular bushing 62, a second tubular bushing 72 and an annular thrust bearing assembly 80 that does not require any maintenance or lubrication over the one million mile life of the heavy duty truck and that has a finite wear that allows operation of the steering system without appreciable degradation of steering system performance, as described herein. The self-lubricated bearing system has an adequate amount of lubricant therein at a beginning of life state and the amount of the lubricant being sufficient for an end of life state defined by at least one million miles of operation of the heavy duty truck, without replenishment of the lubricant, as described further herein The first tubular bushing 62 has an exterior surface 66 and an interior surface 68. The first tubular bushing 62 is positioned in the second bore 38 with the exterior surface 66 engaging a portion of the interior surface 32 of the first arm 30A. The interior surface 68 of the first tubular bushing 62 slidingly engages a portion of the exterior surface 52 of the pin 50. A cap 69 is secured to the first exterior axial end surface 34 by suitable fasteners 69A (e.g., bolts) to cover the second bore 38. A seal 69B is disposed between and engages with an underside of a cap 69 and the first exterior axial end surface 34 of first arm 30A. A seal 82A may be positioned on the pin 50 in the second bore 38 between the second axial end 22 and the exterior surface 52 of the pin 50.

The second tubular bushing 72 has an exterior surface 76 and an interior surface 78. The second tubular bushing 72 is positioned in the third bore 56 with the exterior surface 76 engaging a portion of the interior surface 40 of the second arm 30B. The interior surface 78 of the second tubular bushing 72 slidingly engages a portion of the exterior surface 52 of the pin 50. A cap 79 is secured to the second exterior axial end surface 42 by suitable fasteners 79A to cover the third bore 46. A seal 79B is disposed between and engages with an underside of cap 79 and the second exterior axial end surface 42 of second arm 30B. A seal 82B may be positioned on the pin 50 in the third bore 46 between the second interior axial end surface 44 and the exterior surface 52 of the pin 50.

The annular thrust bearing assembly 80 having a fourth bore 81 is disposed between the first axial end surface 20 of the connecting end 14 and the second interior axial end surface 44 of the second arm 30B. The pin 50 extends through and is coaxial with the fourth bore 81. The annular thrust bearing assembly 80 includes a first portion (e.g., an upper plate) 80A is in rotational communication with a second portion (e.g., a lower plate) 80B. The upper plate 80A is generally annular and defines an outer bearing surface 83 and an inner bearing surface 84. The lower plate 80B is generally annular and defines an outer bearing surface 86 and an inner bearing surface 87.

Figure 3:
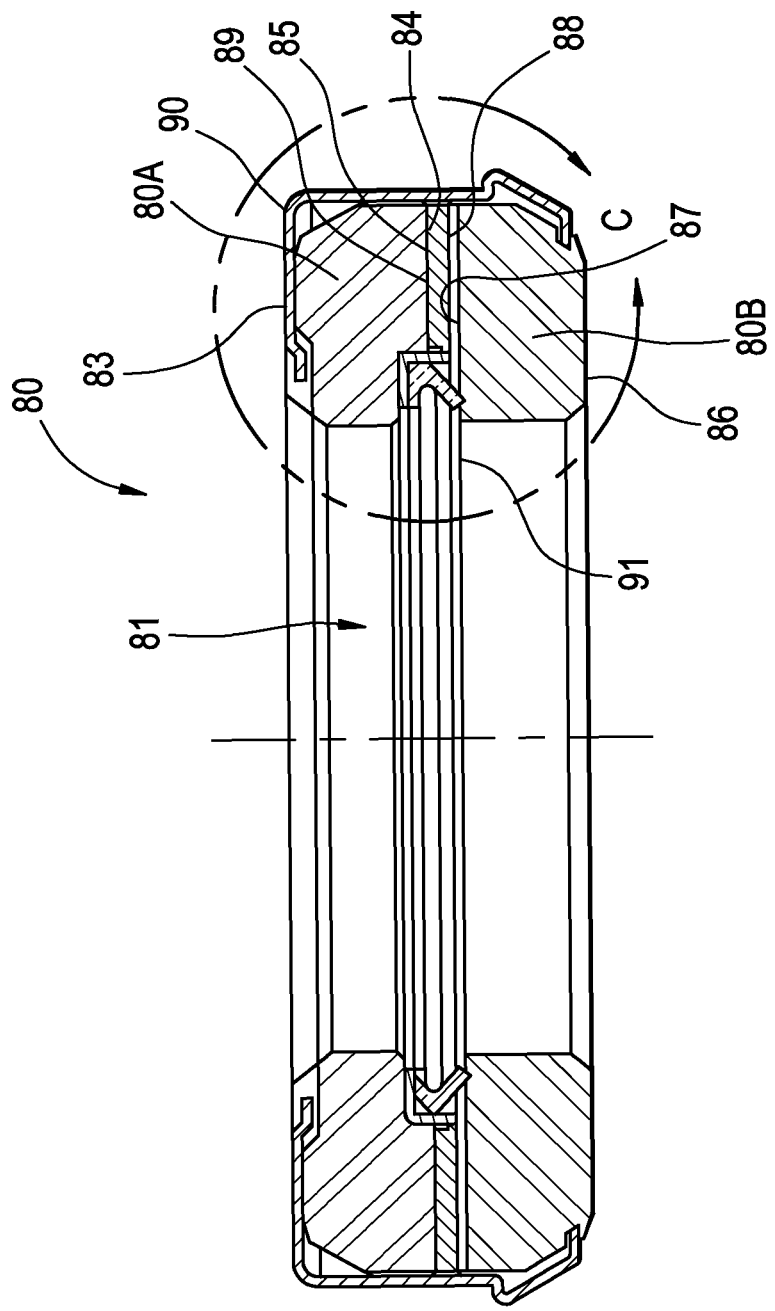
FIG. 3 is an enlarged cross sectional view of a self-lubricated embodiment of the thrust bearing assembly shown in FIG. 2.
Figure 4:
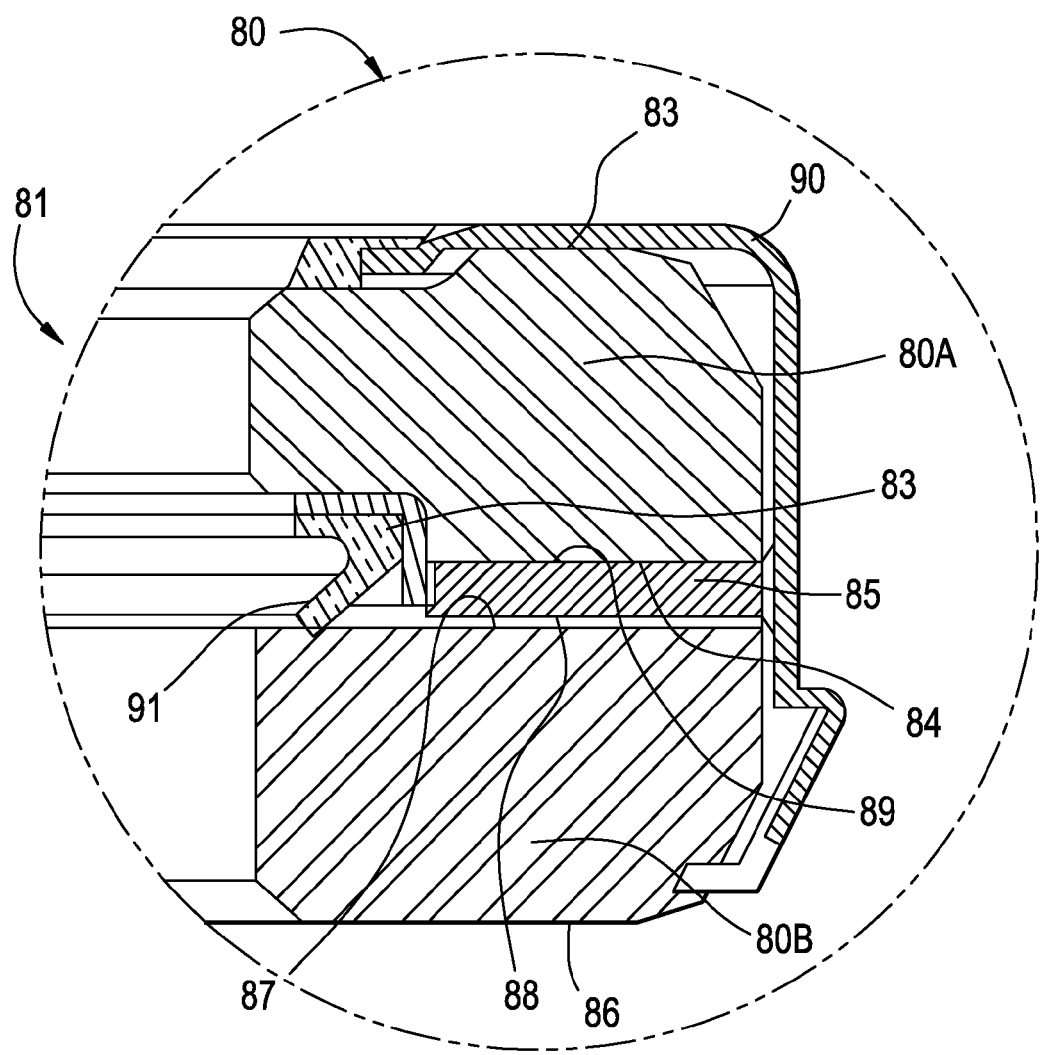
FIG. 4 is an enlarged cross sectional view of a portion C of the self-lubricated thrust bearing assembly of FIG. 3.

In the embodiment illustrated in FIGS. 3 and 4, the annular thrust bearing assembly 80 includes a generally annular self-lubricated thrust bearing 85. In the embodiment shown in FIGS. 3 and 4 the thrust bearing is a thrust washer manufactured from a self-lubricated material as described below and having a first surface 88 and a second surface 89. The thrust bearing 85 is positioned between the upper plate 80A and the lower plate 80B, such that the inner bearing surface 84 slidingly engages the second surface 89 and the inner bearing surface 87 slidingly engages the first surface 88.

An annular seal 91 having a V-shaped cross section is positioned in the fourth bore 81, between the upper plate 80A and the lower plate 80B to prevent debris and contamination from reaching the annular self-lubricated thrust bearing 85. Another seal 90 is positioned on peripheral areas of the upper plate 80A and the lower plate 80B, respectively and wraps partially around the outer surface 83 of the upper plate 80A. The seal 90 extends between the upper plate 80A and the lower plate 80B. The seal 90 prevents debris and contamination from reaching the annular self-lubricated thrust bearing 85. The configuration of the seals 90 and 91 is not limited to that described herein and illustrated in FIGS. 3 and 4, as seals having other cross sectional shapes and sizes may also be employed, including, but not limited to C-shaped cross sections, circular cross sections and the like.

Figure 5:
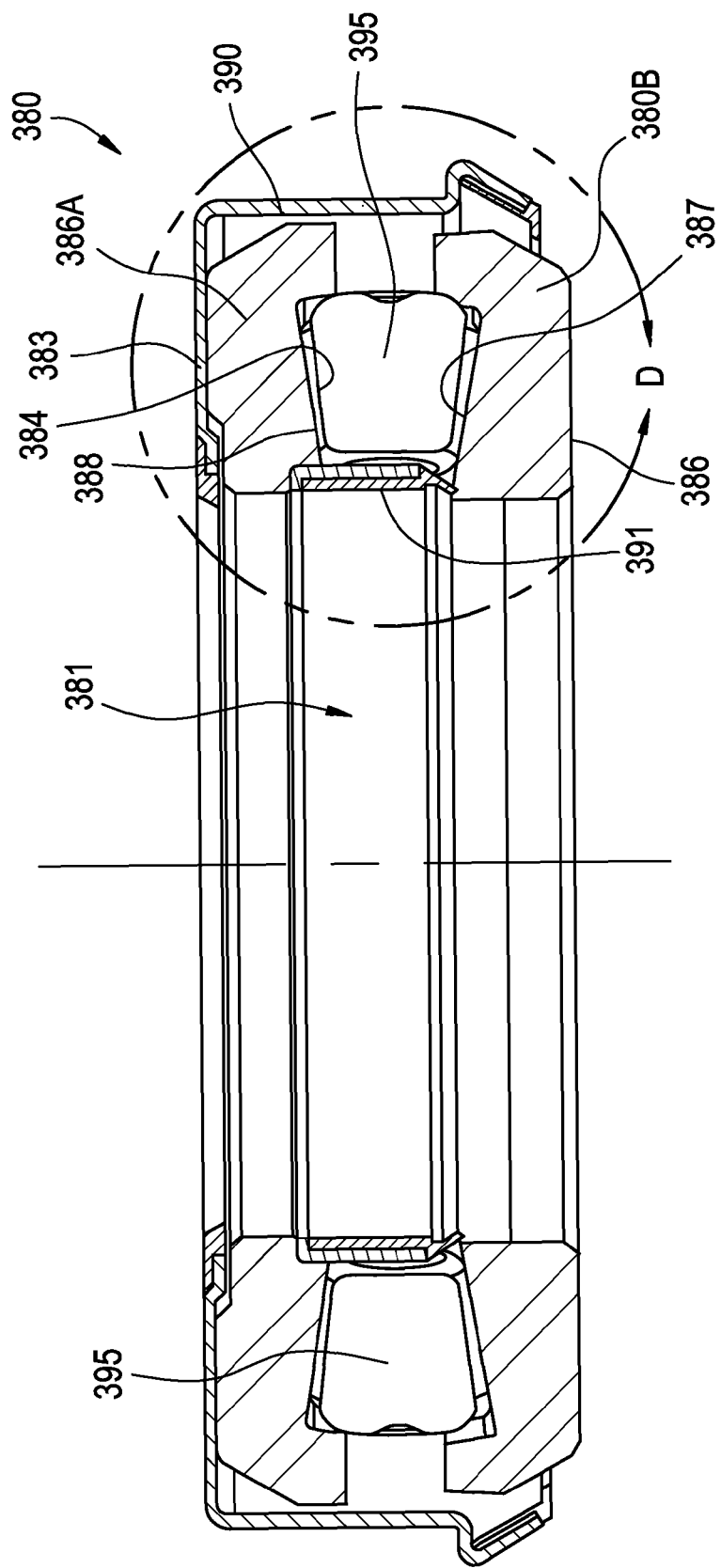
FIG. 5 is an enlarged cross sectional view of a sealed tapered roller bearing embodiment of the thrust bearing assembly shown in FIG. 2.
Figure 6:
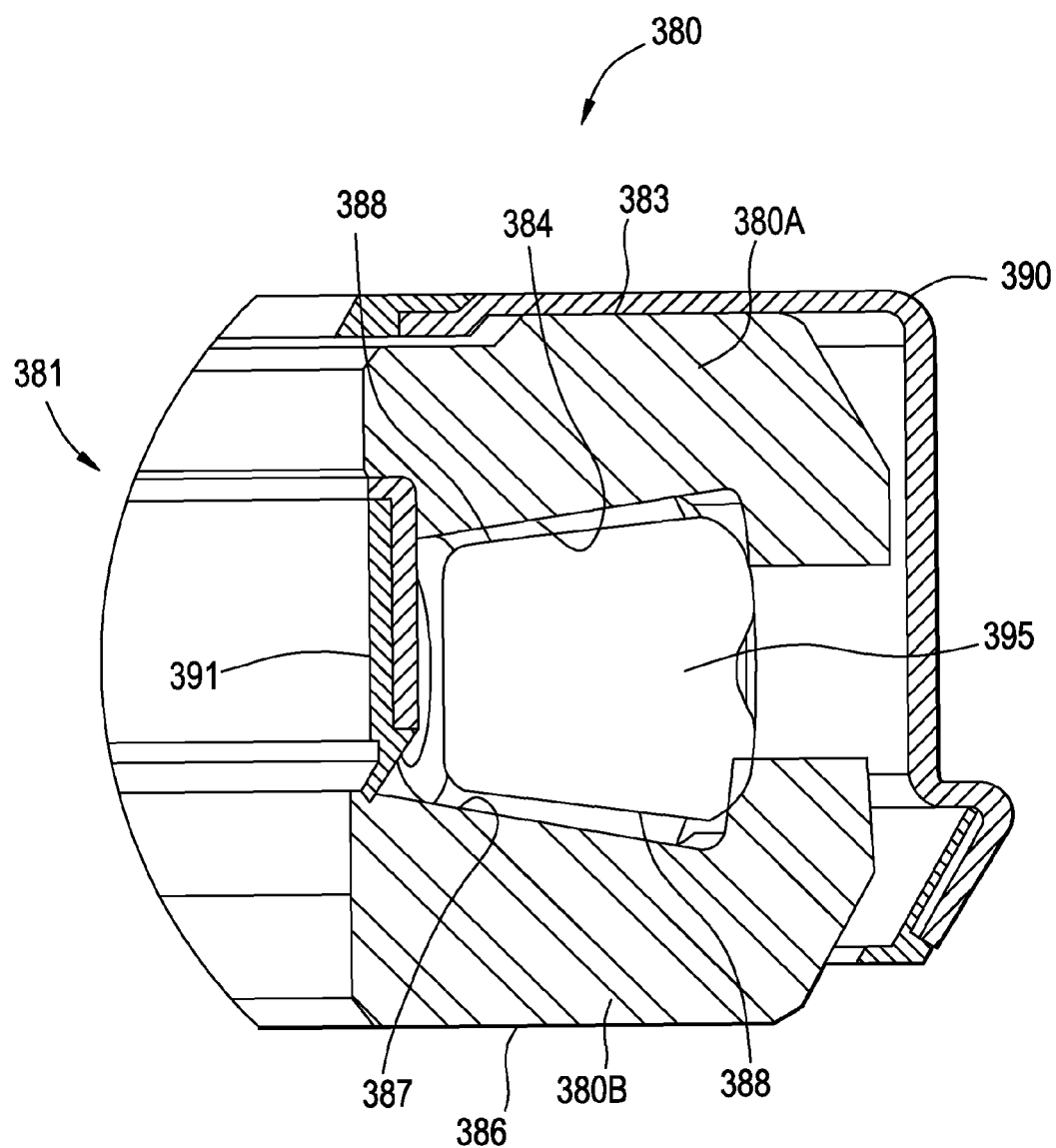
FIG. 6 is an enlarged cross sectional view of a portion D of the sealed tapered roller bearing of FIG. 5.

The annular rolling element thrust bearing assembly 380 of FIGS. 5 and 6 is similar to the annular thrust bearing 80 of FIGS. 1-4. Accordingly, like elements have been assigned like references numbers preceded by the numeral 3. The annular rolling element thrust bearing assembly 380 is a sealed roller bearing assembly, wherein the thrust bearing 385 consists of a plurality of rolling elements 395 (e.g., tapered rolling elements are shown for example) disposed between the upper plate 380A and the lower plate 380B. The rolling elements 395 are manufactured from a metallic material. Each of the rolling elements 395 define an exterior surface 388 that is in rolling engagement with the inner surface 384 of the upper plate 380A and the inner surface 387 of the lower plate 380B. While the annular rolling element thrust bearing assembly 380 is shown and described as having a plurality of tapered rolling elements, the present invention is not limited in this regard as other rolling elements may be employed including but not limited to ball bearings, cylindrical bearings and needle bearings.

An annular seal 391 having a generally rectangular cross section is positioned in the fourth bore 381, between the upper plate 380A and the lower plate 380B to prevent debris and contamination from reaching the rolling elements 395. Another seal 390 is positioned on a peripheral area of the upper plate 380A and the lower plate 380B and wraps partially around the outer surface 383 of the upper plate 380A. The seal 390 extends between the upper plate 380A and the lower plate 380B. The seal 390 prevents debris and contamination from reaching the rolling elements 395. The seals 390 and 391 maintain a lubricant (e.g., grease) between the upper plate 380A and the lower plate 380B and around the rolling elements 395 so as not to require periodic replenishment of the lubricant. The configuration of the seals 390 and 391 is not limited to that described herein and illustrated in FIGS. 5 and 6, as seal having other cross sectional shapes and sizes may also be employed, including, but not limited to C-shaped cross sections, circular cross sections and the like.

Referring back to FIGS. 3 and 4, the self-lubricated thrust plate 85, first tubular bushing 62 and the second tubular bushing 72 are manufactured using a self-lubricated material and liners, such as but not limited to polytetrafluoroethylene (PTFE) materials and liner systems with resins including, phenolic resins, polymid resins and polymid resins in conjunction with fiber weaves, fabrics or matrix materials, including but not limited to polyester, meta-aramids (e.g., NOMEX), PTFE and glass. In one embodiment, the self-lubricated material and liners are a homogeneous entity or are a molded nearly homogenous system without a weave, fabric or matrix and are manufactured from one or more acrylates, as described further herein with respect to FIG. 10. In one embodiment, the self-lubricated material and liners are ceramic materials and metals. In one embodiment, the self-lubricated material is disposed on a metal substrate as described herein with reference to FIGS. 7B, 8B and 11. The self-lubricated material from which the self-lubricated thrust bearing 85, first tubular bushing 62 and/or the second tubular bushing 72 are manufactured has properties and characteristics sufficient to withstand high loads with insignificant wear. The use of the self-lubricated material in the manufacture of the self-lubricated thrust bearing 85, the first tubular bushing 62 and/or the second tubular bushing 72, allows lubricious properties of the self-lubricated material to be maintained without addition of a lubricating agent such as oil or grease.

The king pin assembly 10 and the self-lubricated thrust bearing 85, the first tubular bushing 62 and/or the second tubular bushing 72 are operational for extended life, without the need for lubrication or maintenance, when compared to prior art bearings. In one embodiment, the self-lubricated material has a dynamic capacity of 38,000 pounds per square inch so that the self-lubricated thrust bearing 85, the first tubular bushing 62 and/or the second tubular bushing 72 can withstand high loads (e.g., high dynamic loads) and vibrations without damaging the self-lubricated thrust bearing 85, the first tubular bushing 62 and/or the second tubular bushing 72.

The use of the self-lubricated material in the manufacture of the self-lubricated thrust bearing 85, the first tubular bushing 62 and/or the second tubular bushing 72 allows for a low coefficient of friction as well as inherent vibration- and noise-dampening qualities. The use of the self-lubricated material in the manufacture of the self-lubricated thrust bearing 85, the first tubular bushing 62 and/or the second tubular bushing 72 is further lead-free while remaining electrically non-conducting and non-magnetic. The use of the self-lubricated material in the manufacture of the self-lubricated thrust bearing 85, the first tubular bushing 62 and/or the second tubular bushing 72, allows operation at temperatures beyond the range of prior art lubricants, for example between −320° F. to 400° F. without the cold-flow tendencies of solid or filled PTFE resins. Further benefits of the use of the self-lubricated material in the manufacture of the self-lubricated thrust bearing 85, the first tubular bushing 62 and/or the second tubular bushing 72 include high resistance to fatigue under shock loads, resistance to attack by most substances, and elimination of fretting corrosion. The use of the self-lubricated material in the manufacture of the self-lubricated thrust bearing 85, the first tubular bushing 62 and/or the second tubular bushing 72 additionally provides good dimensional stability, freedom from stick-slip, and compatibility with a wide range of mating materials.

In one embodiment, the first tubular bushing 62 and the second tubular bushing 72 and/or the thrust bearing 85 are lubricated with a lubricant, for example, grease, during the manufacturing process. The seal 82A may be positioned on the pin 50 in the second bore 38 and is disposed between and engages with the second axial end 22 and the exterior surface 52 of the pin 50. The seal 82B may be positioned on the pin 50 in the third bore 46 and is disposed between and engages with the second interior axial end surface 44 and the exterior surface 52 of the pin 50.

Figure 7A:
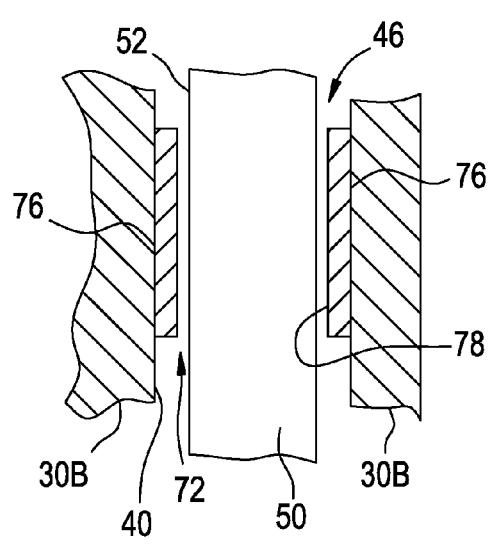
FIG. 7A is an enlarged view of an embodiment of the portion B of the truck axle assembly of FIG. 1, with the bushing being a self-lubricated material and shown secured to an interior surface of the arm.

In the embodiment illustrated in FIG. 7A, the second tubular bushing 72 is manufactured from a self-lubricated material having low friction characteristics or qualities, as described above. The exterior surface 76 of the second tubular bushing 72 is secured to the generally cylindrical interior surface 40 of the second arm 30B. In one embodiment, the exterior surface 76 of the second tubular bushing 72 defines a bonding surface that is secured to the generally cylindrical interior surface 40 of the second arm 30B by bonding using temperature and pressure. One example of bonding is an adhesive bonding process. The interior surface 78 of the second tubular bushing 72 slidingly engages the exterior surface 52 of the pin 50.

The first tubular bushing 62 is configured similar to the second tubular bushing 72. In one embodiment, the first tubular bushing 62 is secured to the generally cylindrical interior surface 32 of the first arm 30A and slidingly engages the exterior surface 52 of the pin 50, in a manner similar to that described above for the second tubular bushing 72, with reference to FIG. 7A.

Figure 7B:
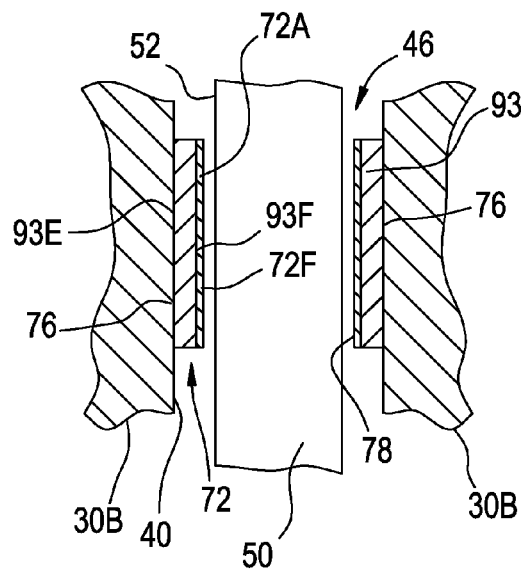
FIG. 7B is an enlarged view of an embodiment of the portion B of the truck axle assembly of FIG. 1, with the bushing being a metal-backed self-lubricated material and shown with the metal backing secured to an interior surface of the arm.

In the embodiment illustrated in FIG. 7B, the second tubular bushing 72 is manufactured from a self-lubricated material having low friction characteristics or qualities, as described above, secured to a metal substrate 93. The exterior surface 76 of the second tubular bushing 72 is defined by an exterior surface 93E of the metal substrate 93 which is secured to the generally cylindrical interior surface 40 of the second arm 30B. In one embodiment, the exterior surface 76 of the second tubular bushing 72 defines a bonding surface that is secured to the generally cylindrical interior surface 40 of the second arm 30B by bonding using temperature and pressure. One example of bonding is an adhesive bonding process. A self-lubricated liner 72A is secured to an interior surface 93F of the metal substrate 93. The interior surface 78 of the second tubular bushing 72 is defined by a radially inward facing surface 72F of the self-lubricated liner 72A which slidingly engages the exterior surface 52 of the pin 50. In one embodiment, the self-lubricated liner 72A is about 0.008 to about 0.015 inches thick and the metal substrate 93 is thicker than the self-lubricated liner 72A and is sized to support the self-lubricated liner 72A and to allow the second tubular bushing 72 to fit between the generally cylindrical interior surface 40 of the second arm 30B and the exterior surface 52 of the pin 50.

The first tubular bushing 62 is configured similar to the second tubular bushing 72 with a self-lubricated liner 172A secured to a metal substrate 93. In one embodiment, the first tubular bushing 62 is secured to the generally cylindrical interior surface 32 of the first arm 30A and slidingly engages the exterior surface 52 of the pin 50, in a manner similar to that described above for the second tubular bushing 72, with reference to FIG. 7B.

Figure 8A:
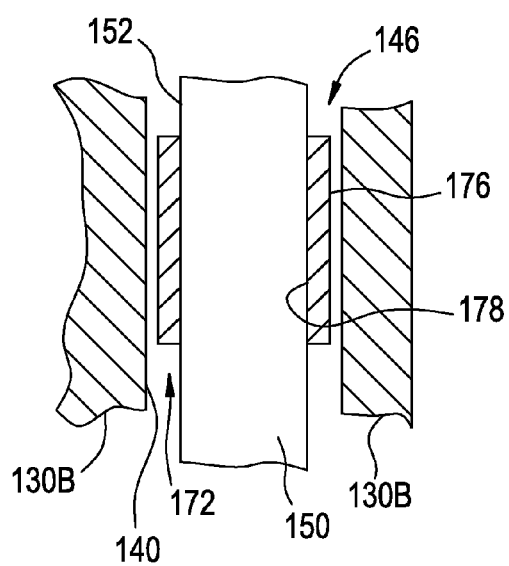
FIG. 8A is an enlarged view of an embodiment of the portion B of the truck axle assembly of FIG. 1, with the bushing being a self-lubricated material and shown secured to the pin.

The portion of the truck axle assembly 10 illustrated in FIG. 8A is similar to that of FIG. 7A. Thus like elements are assigned like reference numbers preceded by the numeral 1. As illustrated in FIG. 8A, the second tubular bushing 172 is manufactured from a self-lubricated material having low friction characteristics or qualities, as described above. The interior surface 178 of the second tubular bushing 172 is secured to the exterior surface 152 of the pin 150. In one embodiment, the interior surface 178 of the second tubular bushing 172 defines a bonding surface that is secured to the exterior surface 152 of the pin 150 by bonding using temperature and pressure. One example of bonding is an adhesive bonding process. The exterior surface 176 of the second tubular bushing 172 slidingly engages the generally cylindrical interior surface 140 of the second arm 130B.

The first tubular bushing 162 is configured similar to the second tubular bushing 172. In one embodiment, the first tubular bushing 62 is secured to the exterior surface 52 of the pin and slidingly engages 50 the generally cylindrical interior surface 32 of the first arm 30A, in a manner similar to that described above for the second tubular bushing 172, with reference to FIG. 8A.

Figure 8B:
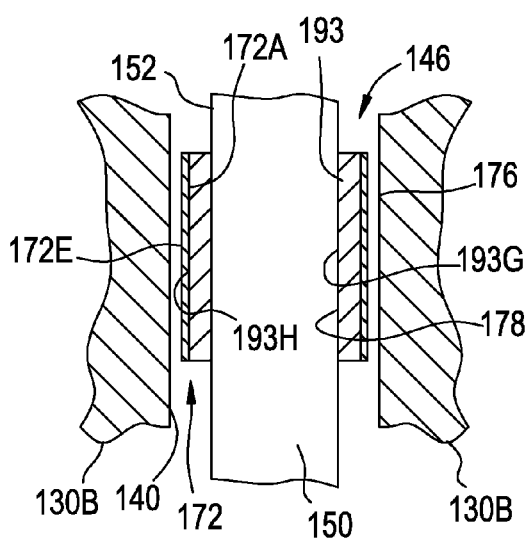
FIG. 8B is an enlarged view of an embodiment of the portion B of the truck axle assembly of FIG. 1, with the bushing being a metal-backed self-lubricated material and shown with the metal backing secured to the pin.

The portion of the truck axle assembly 10 illustrated in FIG. 8B is similar to that of FIG. 7A. Thus like elements are assigned like reference numbers preceded by the numeral 1. As illustrated in FIG. 8B, the second tubular bushing 172 is manufactured from a self-lubricated material having low friction characteristics or qualities, as described above, secured to a metal substrate 193. The interior surface 178 of the second tubular bushing 172 is defined by a radially inward facing surface 193G of the metal substrate 193 and is secured to the exterior surface 152 of the pin 150. In one embodiment, the interior surface 178 of the second tubular bushing 172 defines a bonding surface that is secured to the exterior surface 152 of the pin 150 by bonding using temperature and pressure. One example of bonding is an adhesive bonding process. A self-lubricated liner 172A is secured to a radially outward facing surface 193H of the metal substrate 193. The exterior surface 176 of the second tubular bushing 172 is defined by a radially outward facing surface 172E of the self-lubricated liner 172A which slidingly engages the generally cylindrical interior surface 140 of the second arm 130B. In one embodiment, the self-lubricated liner 172A is about 0.008 to about 0.015 inches thick and the metal substrate 193 is thicker than the self-lubricated liner 172A and is sized to support the self-lubricated liner 172A and to allow the second tubular bushing 172 to fit between the generally cylindrical interior surface 140 of the second arm 130B and the exterior surface 152 of the pin 150.

The first tubular bushing 162 is configured similar to the second tubular bushing 172 with a self-lubricated liner 172 secured to a metal substrate 193. In one embodiment, the first tubular bushing 62 is secured to the exterior surface 52 of the pin and slidingly engages 50 the generally cylindrical interior surface 32 of the first arm 30A, in a manner similar to that described above for the second tubular bushing 172, with reference to FIG. 8B.

Figure 9A:
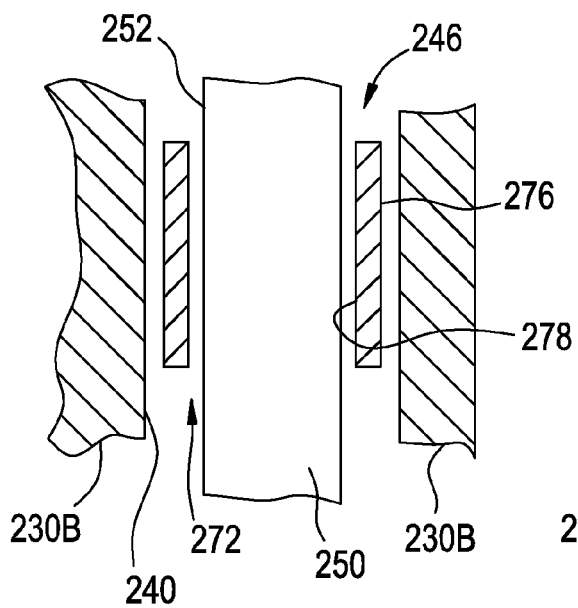
FIG. 9A is an enlarged view of an embodiment of the portion B of the truck axle assembly of FIG. 1, with the bushing in sliding engagement with the pin and the arm.

The portion of the truck axle assembly 10 illustrated in FIG. 9A is similar to that of FIG. 7. Thus like elements are assigned like reference numbers preceded by the numeral 2. As illustrated in FIG. 9A, the second tubular bushing 272 is manufactured from a self-lubricated material having low friction characteristics or qualities, as described above. The interior surface 278 of the second tubular bushing 272 slidingly engages the exterior surface 252 of the pin 250. The exterior surface 276 of the second tubular bushing 272 slidingly engages the generally cylindrical interior surface 240 of the second arm 230B.

In one embodiment, the interior surface 68 of the first tubular bushing 62 slidingly engages the exterior surface 52 of the pin 50 and the exterior surface 66 of the first tubular bushing 62 slidingly engages generally cylindrical interior surface 32 of the first arm 30A, in a manner similar to that described above for the second tubular bushing 272, with reference to FIG. 9A.

Figure 9B:
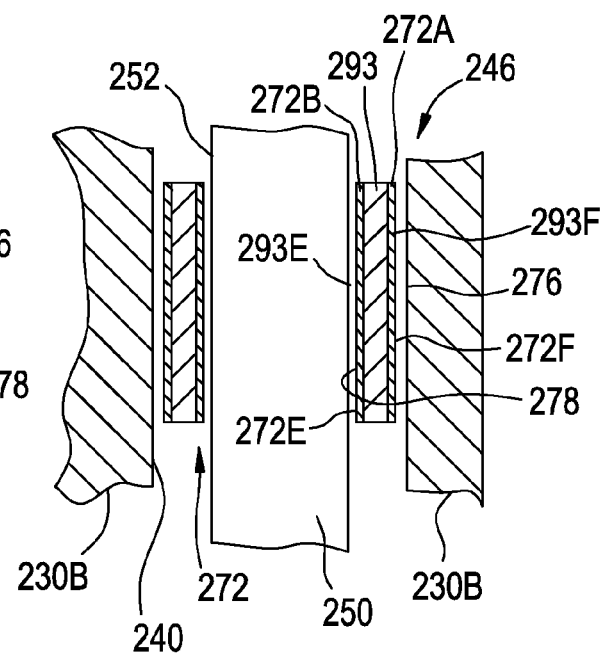
FIG. 9B is an enlarged view of an embodiment of the portion B of the truck axle assembly of FIG. 1, with the bushing being a metal substrate with a self-lubricated liner secured to opposing sides of and the self-lubricated liner being in sliding engagement with the pin and the arm.

The portion of the truck axle assembly 10 illustrated in FIG. 9B is similar to that of FIG. 7. Thus like elements are assigned like reference numbers preceded by the numeral 2. As illustrated in FIG. 9B, the second tubular bushing 272 is manufactured from a tubular metal substrate 293 with a first self-lubricated liner 272A secured to a radially outward facing surface 293F of the metal substrate 293 and a second self-lubricated liner 272B secured to a radially inward facing surface 293E of the metal substrate 293. The first and second self-lubricated liners 272A and 272B are manufactured from the self-lubricated material having low friction characteristics or qualities, as described above. The interior surface 278 of the second tubular bushing 272 is defined by an interior surface 272E which slidingly engages the exterior surface 252 of the pin 250. The exterior surface 276 of the second tubular bushing 272 is defined by an exterior surface 272F which slidingly engages the generally cylindrical interior surface 240 of the second arm 230B.

In one embodiment, the interior surface 68 of the first tubular bushing 62 slidingly engages the exterior surface 52 of the pin 50 and the exterior surface 66 of the first tubular bushing 62 slidingly engages generally cylindrical interior surface 32 of the first arm 30A, in a manner similar to that described above for the second tubular bushing 272, with reference to FIG. 9B.

Figure 10:
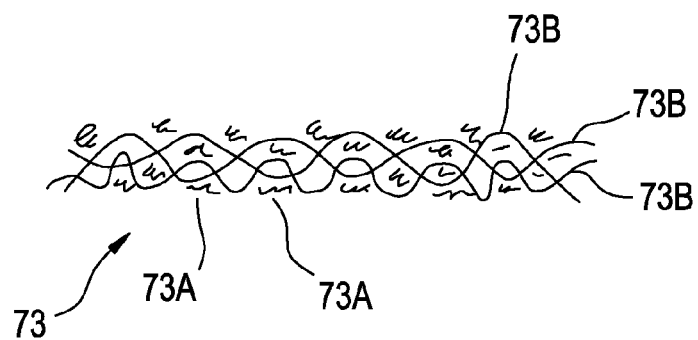
FIG. 10 is an enlarged cross sectional schematic illustration of a woven low friction bushing liner.

In one embodiment, as shown, for example, in FIG. 10, the self-lubricated thrust bearing 85, the first tubular bushing 62 and the second tubular bushing 72 are manufactured from a self-lubricated woven fabric 73. The woven fabric 73 includes a plurality of fibers 73B interwoven with one another and polytetrafluoroethylene (PTFE) 73A interwoven therewith. The fibers 73B include, for example, a polyester material, a stainless steel material and/or glass material. The fibers 73B interwoven with the PTFE enhance bondability of the first tubular bushing 62 and/or the second tubular bushing 72 to a substrate such as, for example the exterior surface 52 of the pin 50, the interior surface 32 of the first arm 30A, the interior surface 40 of the second arm 30B, the inner surface 84 of the upper plate 80A and the inner surface 87 of the lower plate 80B.

Figure 11:
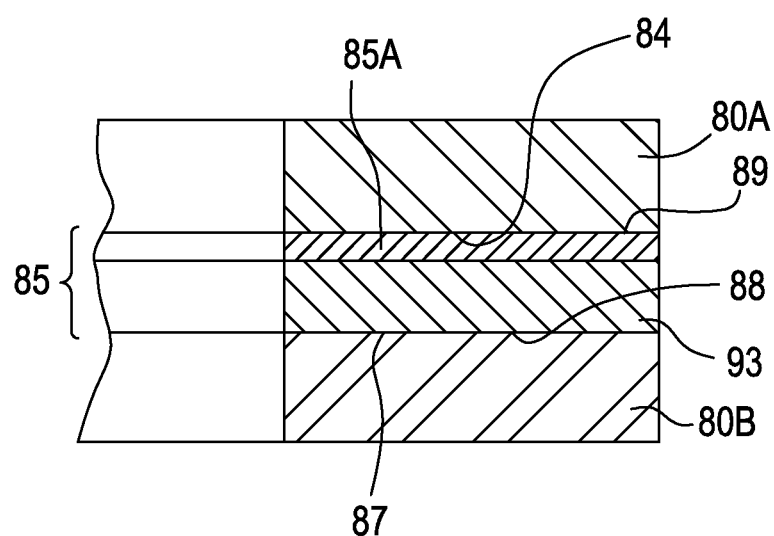
FIG. 11 is a schematic cross sectional view of a portion of the self-lubricated thrust bearing assembly with a metal backing secured to the self-lubricated material.

Referring to FIG. 11, the thrust bearing 85 has the metal backing secured thereto, for example, by an adhesive. In particular, the first surface 88 of the self-lubricated thrust bearing 85 has one side of the metal backing 93 secured thereto. An opposite side of the metal backing 93 is secured to the inner bearing surface 87 of the lower thrust plate 80B. The second surface 89 of the self-lubricated thrust bearing 85 is in sliding engagement with the inner bearing surface 84 of the upper thrust plate 80A. While the metal backing 93 is shown and described as being secured to the lower thrust plate 80B, the present invention is not limited in this regard as the metal backing may be secured to the upper plate 80A and be in sliding engagement with the lower thrust plate 80B. In one embodiment, the self-lubricated liner 85A is about 0.008 to about 0.015 inches thick and the metal substrate 93 is thicker than the self-lubricated liner 85A and is sized to support the self-lubricated liner 85A and to allow the thrust bearing 85 to fit between the upper thrust plate 90A and the lower thrust plate 90B.

In one embodiment, all of the thrust bearing 85, the first tubular bushing 62 and the second tubular bushing 72 have metal backing liners, for example the self-lubricated liner 72A, 172A secured to the metal substrate 93, 193 as described above with reference to FIGS. 7B, 8B and 11.

Figure 12:
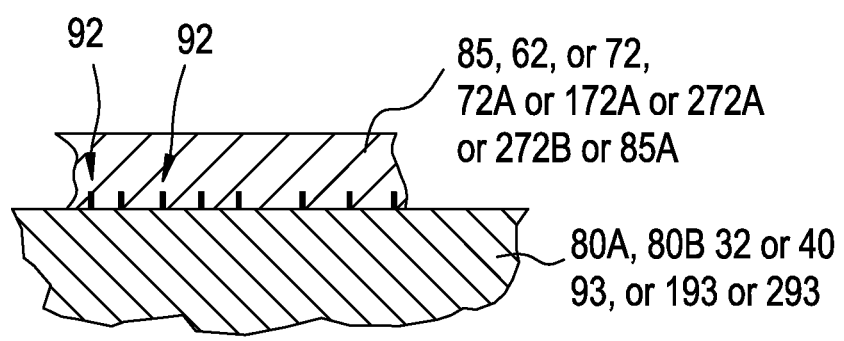
FIG. 12 is a partial cross sectional view of the self-lubricated material secured to a substrate having protrusions extending therefrom.

Referring to FIG. 12, in one embodiment one side the self-lubricated material of the self-lubricated thrust bearing 85, the first tubular bushing 62 and/or the second tubular bushing 72 or the self-lubricated liner 85A (FIG. 11), the self-lubricated liner 72 or 172 (FIGS. 7B and 8B) is secured to a substrate (e.g., the lower thrust plate 80A, the upper thrust plate 80B, the interior surface 32, the interior surface 40 or the metal substrate 93, 193) by protrusions 92 (e.g., pins, spikes, ridges or keys) that extend from the substrate into the self-lubricated material. While the protrusions 92 are described as extending from the substrate into the self-lubricated material, the present invention is not limited in this regard as other configurations for securing the self-lubricated material to the substrate may be employed including but not limited to dimples in the substrate, roughened surface finish of the substrate, keyways in the substrate and or the use of adhesives (e.g., epoxy or phenolic).

The employer of the inventors' employer has conducted several hundred hours of analysis and experimental testing (e.g., rotational load and accelerated life cycle testing in a test rig) to arrive at the king pin assembly 10 disclosed herein. The inventors' employer has surprisingly discovered that use of the self-lubricated thrust bearing 85, first tubular bushing 62 and/or the second tubular bushing 72 in the king pin assembly 10, results in the king pin assembly 10 being able to achieve extended life criteria in high mileage commercial vehicles such as Class 4 through 8 trucks. In one embodiment, the extended life criteria for a Class 4 through 8 truck requires that the torque required to turn a steering wheel that operates the king pin assembly 10 remains within a predetermined torque range after 1,000,000 miles of travel of the having the king pin assembly 10 (i.e., as disclosed herein) installed therein and without performing any maintenance on or lubricating the king pin assembly 10. The predetermined torque range is based on minimizing torque to mitigate operator fatigue while having the torque high enough to prevent over steering by the operator caused when the torque is too low.

In one embodiment, the extended life criteria for a Class 4 through 8 truck having the king pin assembly 10 requires that the exterior surface 52 of the pin 50 has no operational effecting wear after 1,000,000 miles of travel. In one embodiment, the extended life criteria for a Class 4 through 8 truck having the king pin assembly 10 requires that the interior surface 68 of the first tubular bushing 62 has no operational effecting wear after 1,000,000 miles of travel. In one embodiment, the extended life criteria for a Class 4 through 8 truck having the king pin assembly 10 requires that the interior surface 78 of the second tubular bushing 72 has operational effecting wear after 1,000,000 miles of travel. In one embodiment, the extended life criteria for a Class 4 through 8 truck having the king pin assembly 10 requires that the inner bearing surface 84 of the upper plate 80A and the inner bearing surface 87 of the lower plate 80B have no operational effecting wear after 1,000,000 miles of travel. In one embodiment, the extended life criteria for a Class 4 through 8 truck having the king pin assembly 10 requires that the first surface 88 and the second surface 89 of the annular self-lubricated thrust bearing 85 having have no operational effecting wear after 1,000,000 miles of travel. As used herein, the term no operational effecting wear means an insignificant enough amount of wear that allows proper function of the steering assembly without loss of control as compared to a new steering system. In one embodiment, the extended life criteria for a Class 4 through 8 truck having the king pin assembly 10 requires that the annular self-lubricated the first bushing 62 and the second bushing 72 wear less than ⅔ (i.e., less than about 67.7%) from an initial state to a final state after 1,000,000 miles of travel. In one embodiment, the extended life criteria for a Class 4 through 8 truck having the king pin assembly 10 requires that the annular self-lubricated thrust bearing 85 wear less than ⅔ (i.e., less than about 67.7%) from an initial state to a final state after 1,000,000 miles of travel. In one embodiment, the extended life criteria for a Class 4 through 8 truck having the king pin assembly 10 requires that the annular self-lubricated thrust bearing 85 wear less than 5-10% from an initial state to a final state after 1,000,000 miles of travel. In one embodiment, the extended life criteria for the Class 4 through 8 truck having the king pin assembly 10 requires that the annular self-lubricated thrust bearing 85, the first bushing 62 and the second bushing 72 wear less than 0.010 inches from an initial state to a final state after 1,000,000 miles of travel.

Referring to FIG. 13, the testing conducted by the inventors' employer included coefficient of friction testing of four self-lubricated metal backed liners (i.e., self-lubricated materials secured to a metal substrate) at various loads to determine the relationship of dynamic coefficient of friction as a function of load. The results of the tests are plotted on a graph 200 having dynamic coefficient of friction on a Y axis and load in KSI on an X axis. The graph 200 includes plots for Fibriloid and Uniflom E (curve L1 representative of both Fibriloid® and Uniflom® E), Fiberglide® V (curve L2), Fabroid® II and Fabroid® IIG2 (curve L3 representative of both Fabroid® II and Fabroid® IIG2) and Uniflon® HP (curve L4). The tests demonstrate that dynamic coefficient of friction decreased with increasing loads. For example, the dynamic coefficient of friction for the Fibriloid® and Uniflom® E was 0.10 at 4.9 KSI, decreased to 0.06 at 10.1 KSI and decreased further to 0.041 at 40 KSI. The dynamic coefficient of friction for Fiberglide® V (curve L2), Fabroid® II (curve L3), Fabroid® IIG2 (curve L3) and Uniflon® HP (curve L4) have dynamic coefficients of friction greater than 0.035 at loads less than 7 KSI and dynamic coefficients of friction less than 0.04 at loads greater than 20 KSI.

Referring to FIG. 14, the testing conducted by the inventors' employer included torque testing of a roller type thrust bearing and a comparably sized thrust bearing having a self-lubricated thrust bearing 85 therein. The results of the tests are plotted on a graph 201 which has running torque on a Y axis, ft-lbs and load on an X axis, lb, for a roller type thrust bearing (curve L5) and a comparably sized thrust bearing having a self-lubricated thrust bearing therein (curve L6). For example, the roller type thrust bearing (curve L5) demonstrated running torques of 1, 5 and 6 ft-lbs at loads of 1000, 5000 and 6000 lbs, respectively. The thrust bearing with the self-lubricated thrust bearing demonstrated significantly higher running torques, for example, 9, 37.5 and 42.5 ft-lbs at loads of 1000, 5000 and 6000 lbs, respectively. Thus at loads of 5000 lbs and greater the running load of the thrust bearing with the self-lubricated thrust bearing demonstrated running torques of more than seven times than that of the comparable roller type thrust bearing.

Notwithstanding the higher running torque data for the thrust bearing with the self-lubricated thrust bearing as described herein with reference to FIG. 14, the inventors' employer conducted life cycle testing on journal bearings having the self-lubricated material therein, as described herein in reference to FIGS. 15A, 15B, 16A, 16B, 17A and 17B.

Figure 15A:
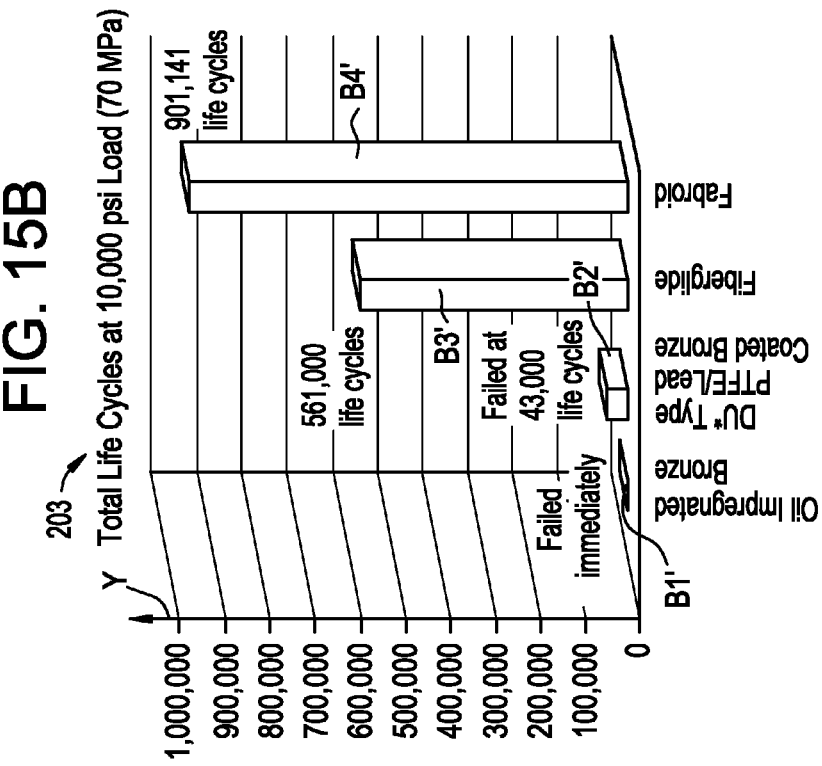
FIG. 15A is a histogram of life cycles for four self-lubricated materials for a load of 5,000 psi.

Referring to FIG. 15A, life cycle wear tests were performed for four self-lubricated materials including oil impregnated bronze (bar B1), DU type PTFE and lead coated bronze (bar B2), Fiberglide® (bar B3) and Fabroid® (bar B4), and the results plotted on a histogram 202 having cycles on a Y axis. The tests were performed at 5,000 psi (2,500 lbs) on a journal bearing having a 1.0 inch inside diameter by 0.5 inch wide. The journal bearings were oscillated +45 degrees at a rate of 30 cycles per minute at room temperature. The impregnated bronze (bar B1) failed at 4,700 cycles, the DU type PTFE and lead coated bronze (bar B2) failed at 140,000 cycles, the Fiberglide® (bar B3) survived 1,090,000 cycles and the Fabroid® (bar B4) survived 1,254,000 cycles.

Figure 15B:
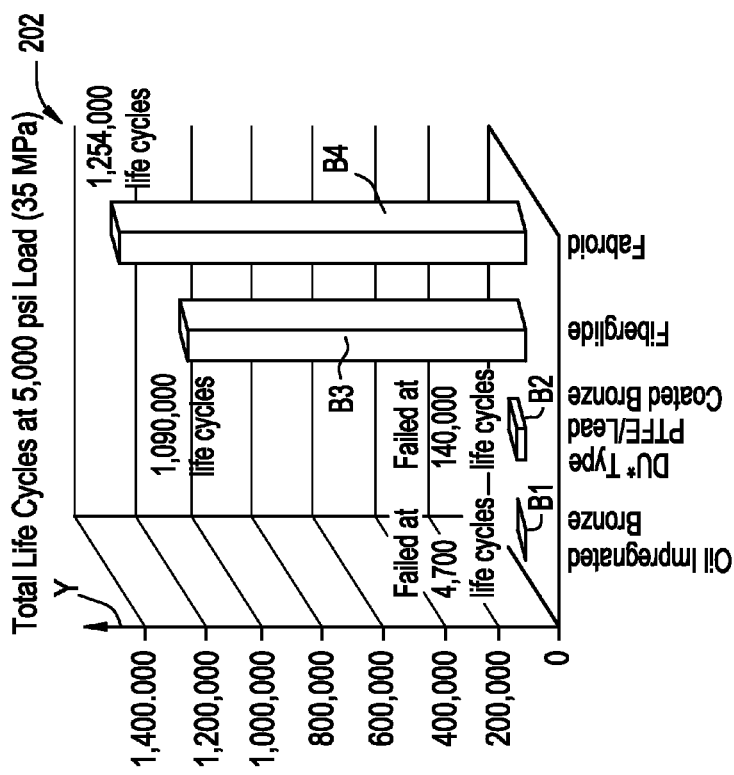
FIG. 15B is a histogram of life cycles for four self-lubricated materials for a load of 10,000 psi.

Referring to FIG. 15B, life cycle wear tests were performed for four self-lubricated materials including oil impregnated bronze (bar B1'), DU type PTFE and lead coated bronze (bar B2'), Fiberglide® (bar B3') and Fabroid® (bar B4'), and the results plotted on a histogram 203 having cycles on a Y axis. The tests were performed at 10,000 psi (5,000 lbs) on a journal bearing having a 1.0 inch inside diameter by 0.5 inch wide. The journal bearings were oscillated +45 degrees at a rate of 30 cycles per minute at room temperature. The impregnated bronze (bar B1') failed immediately, the DU type PTFE and lead coated bronze (bar B2') failed at 43,000 cycles, the Fiberglide® (bar B3') survived 561,000 cycles and the Fabroid® (bar B4') survived 901,141 cycles.

Figure 16A:
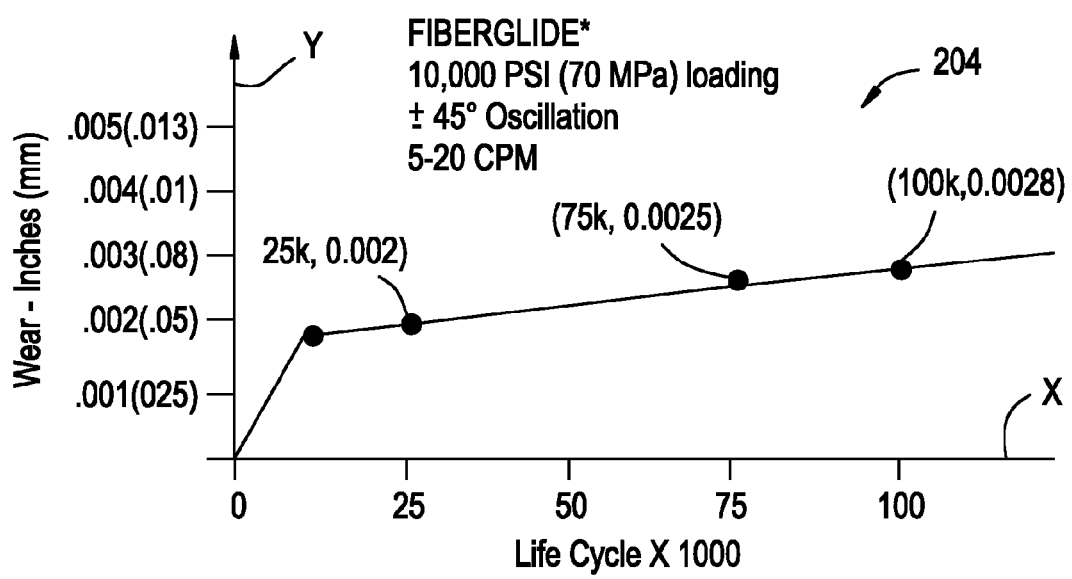
FIG. 16A is a graph of wear versus life cycles for Fiberglide® at a load of 10,000 psi.

Referring to FIG. 16A, the inventors' employer performed life cycle wear tests on a journal bearing having the Fiberglide® self-lubricated material therein. The results of the tests are plotted on a graph 204 having thousands of cycles on an X axis and wear in inches and mm on a Y axis. The tests were performed at 10,000 psi with a ±45 degrees oscillation at a rate of 5 to 20 cycles per minute. At 25,000 cycles the Fiberglide® material had 0.002 inches of wear, at 75,000 cycles had 0.0025 inches of wear and at 100,000 cycles had 0.0028 inches of wear.

Figure 16B:
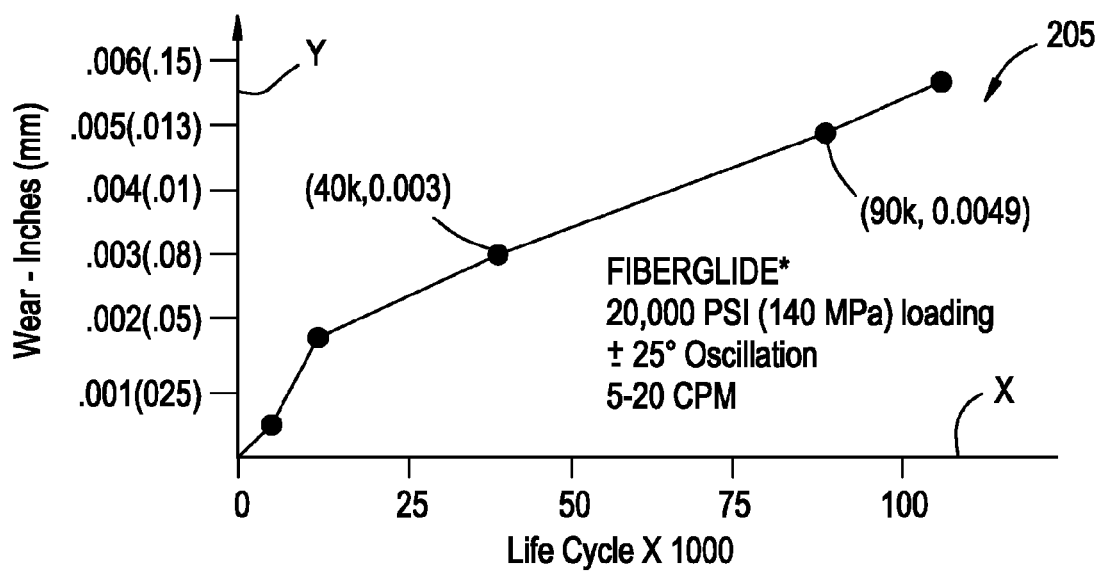
FIG. 16B is a graph of wear versus life cycles for Fabroid® at a load of 20,000 psi.

Referring to FIG. 16B, the inventors' employer performed life cycle wear tests on a journal bearing having the Fibroid® self-lubricated material therein. The results of the tests are plotted on a graph 205 having thousands of cycles on an X axis and wear in inches and mm on a Y axis. The tests were performed at 20,000 psi with a ±25 degrees oscillation at a rate of 5 to 20 cycles per minute. At 40,000 cycles the Fibroid material had 0.003 inches of wear and at 90,000 cycles had 0.0049 inches of wear.

Figure 17A:
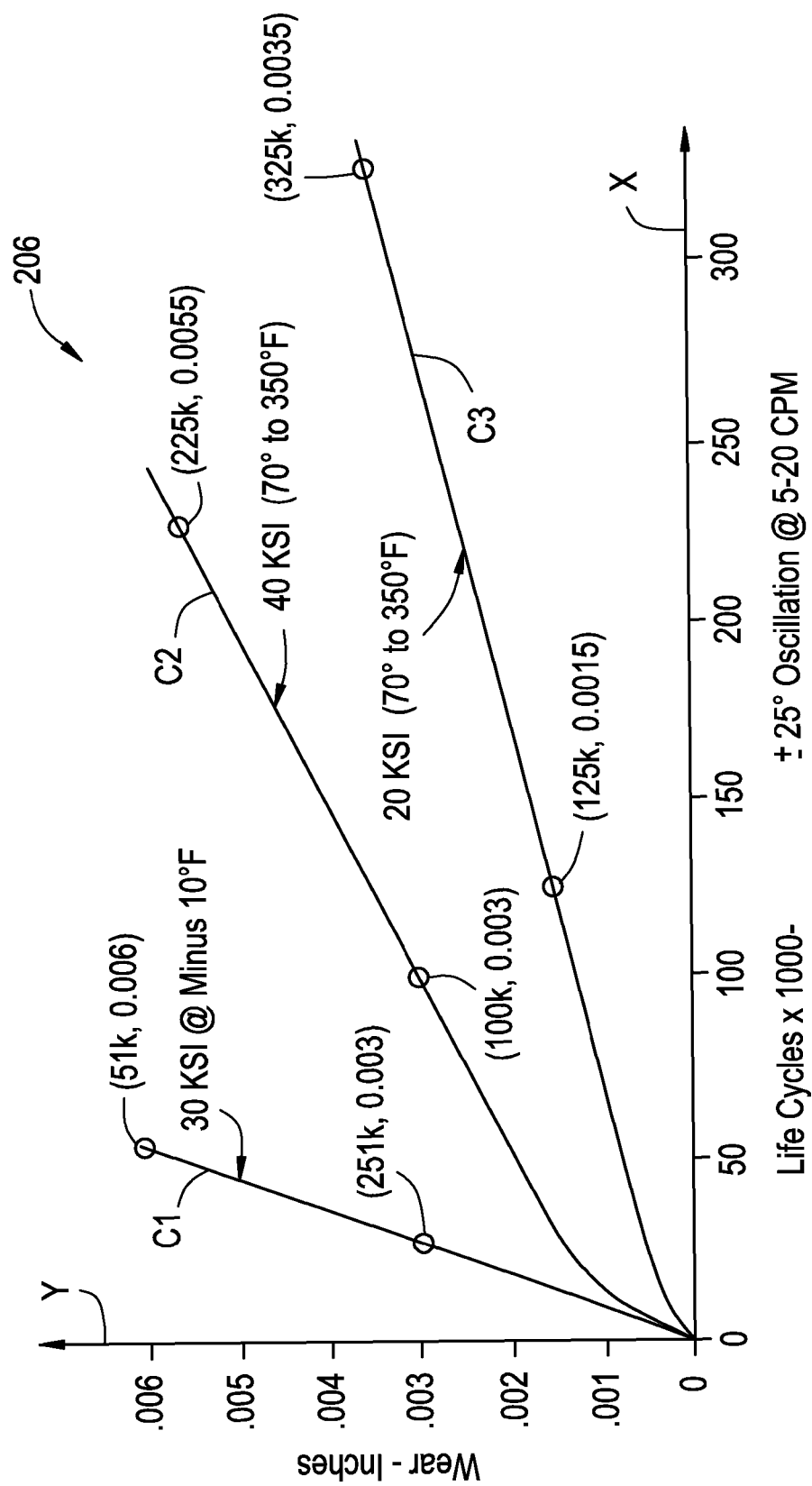
FIG. 17A is a graph of wear versus life cycles for Uniflon® E and Fibriloid® at four different loads.

Referring to FIG. 17A, the inventors' employer performed life cycle wear tests on a journal bearing having the Uniflon® self-lubricated materials therein and on a journal bearing having the Fibriloid® therein. The results of the tests are plotted on a graph 206 having thousands of cycles on an X axis and wear in inches on a Y axis. The tests were performed at 30 KSI with a +25 degrees oscillation at a rate of 5 to 20 cycles per minute at −10° F. (curve C1); 40 KSI with a +25 degrees oscillation at a rate of 5 to 20 cycles per minute at 70 to 350° F. (curve C2); and 20 KSI with a +25 degrees oscillation at a rate of 5 to 20 cycles per minute at 70 to 350° F. (curve C3). Referring to curve C1, 0.003 inches of wear was measured at 25 K cycles and 0.006 inches of wear was measured at 51 K cycles. Referring to curve C2, 0.003 inches of wear was measured at 100 K cycles and 0.0055 inches of wear was measured at 225 K cycles. Referring to curve C3, 0.0015 inches of wear was measured at 125 K cycles and 0.0035 inches of wear was measured at 325 K cycles.

Figure 17B:
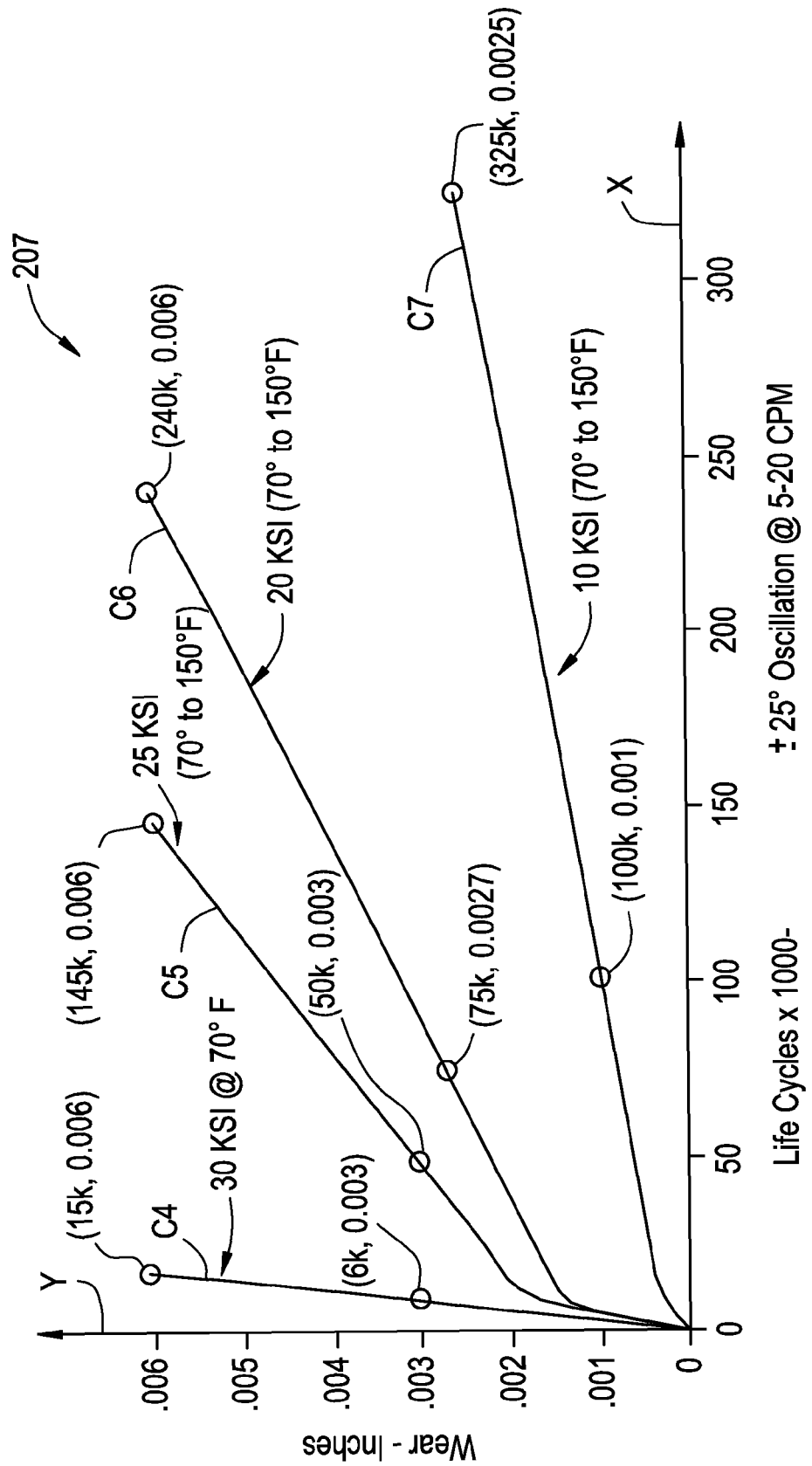
FIG. 17B is a graph of wear versus life cycles for Fiberglide® V and Fabroid® IIG2 at four different loads.

Referring to FIG. 17B, the inventors' employer performed life cycle wear tests on a journal bearing having the Fiberglide® V self-lubricated materials therein and on a journal bearing having the Fabroid® IIG2 therein. The results of the tests are plotted on a graph 207 having thousands of cycles on an X axis and wear in inches on a Y axis. The tests were performed at 30 KSI with a ±25 degrees oscillation at a rate of 5 to 20 cycles per minute at 70° F. (curve C4); 25 KSI with a ±25 degrees oscillation at a rate of 5 to 20 cycles per minute at 70 to 150° F. (curve C5); 20 KSI with a ±25 degrees oscillation at a rate of 5 to 20 cycles per minute at 70 to 150° F. (curve C6); and 10 KSI with a ±25 degrees oscillation at a rate of 5 to 20 cycles per minute at 70 to 150° F. (curve C7). Referring to curve C4, 0.003 inches of wear was measured at 6 K cycles and 0.006 inches of wear was measured at 15 K cycles. Referring to curve C5, 0.003 inches of wear was measured at 50 K cycles and 0.006 inches of wear was measured at 145 K cycles. Referring to curve C6, 0.0027 inches of wear was measured at 75 K cycles and 0.006 inches of wear was measured at 240 K cycles. Referring to curve C7, 0.001 inches of wear was measured at 100 K cycles and 0.0025 inches of wear was measured at 325 K cycles.

While there exists an almost infinite number of combinations of materials and bearing types that could be used for the king pin assembly 10, as a result of the above described testing, the inventors have surprisingly identified several novel and non-obvious combinations of bearing types and self-lubricated materials that achieve the extending life criteria disclosed above. As a result of the inventors' analysis the inventors surprisingly invented a the king pin assembly 10 with the self-lubricated thrust bearing 85, the first tubular bushing 62 and/or the second tubular bushing 72 that includes a self-lubricated being made with a thin layer of self-lubricated material with a higher friction compared to rolling bearings and with finite wear characteristics. The king pin assembly 10 precludes costly maintenance of steering joints in heavy duty Class 4 to 8 trucks over the lifetime of the trucks, which is estimated to be about one million miles of travel. The inventors optimized a finite amount of wear of the self-lubricated material with the increased friction of the self-lubricated material to arrive at the king pin assembly 10 disclosed herein. In addition, use of the king pin assembly 10 disclosed herein results in a predictable finite amount of wear that is consistent from one truck to the next and that is independent of maintenance or the lack thereof.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A steering axle assembly for a heavy duty truck, the steering axle assembly comprising:
   a wheel end having a knuckle section comprising a first arm and a second arm each extending from the knuckle section, the first arm having a first interior surface defining a first bore extending between a first exterior axial end surface and a first interior axial end surface, and the second arm having a second interior surface defining a second bore extending between a second exterior axial end surface and a second interior axial end surface;
   an axle beam having a connecting end, the connecting end having a third interior surface defining a third bore extending between a third axial end surface and a fourth axial end surface;
   a pin having a cylindrical exterior surface, the pin being disposed in and coaxial with the first bore, the second bore and the third bore;
   a self-lubricated bearing system including a first tubular bushing, a second tubular busing and an annular thrust bearing;
   the first tubular bushing being positioned in the first bore and engaging the first interior surface and a portion of the cylindrical exterior surface of the pin;
   the second tubular bushing being positioned in the second bore and engaging the second interior surface and a portion of the cylindrical exterior surface of the pin;
   the annular thrust bearing assembly being disposed between the first interior axial end surface and the third axial end surface, the annular thrust bearing assembly having a first plate in rotational communication with a second plate; and
   the self-lubricated bearing system having an adequate amount of lubricant therein at a beginning of life state and the amount of the lubricant being sufficient for an end of life state defined by at least one million miles of operation of the heavy duty truck, without replenishment of the lubricant.

2. The steering assembly of claim 1, wherein the annular thrust bearing assembly includes a thrust bearing disposed between and slidingly engaging the first plate and the second plate; and
   at least one of the first tubular bushing, the second tubular bushing and the thrust bearing are manufactured from a self-lubricated material.

3. The steering assembly of claim 2, wherein the lubricant in the self-lubricated material is polytetrafluoroethylene.

4. The steering assembly of claim 2, wherein the self-lubricated material is one of a homogenous entity and a homogeneous molded liner.

5. The steering assembly of claim 2, wherein the self-lubricated material is a woven fabric.

6. The steering assembly of claim 2, wherein the self-lubricated material has a dynamic capacity of at least 38,000 pounds per square inch.

7. The steering assembly of claim 2, wherein at least one of the self-lubricated thrust bearing, the first tubular bushing and the second tubular bushing wear less than ⅔ from the beginning of life state to the end of life state.

8. The steering assembly of claim 2, wherein at least one of the self-lubricated thrust bearing, the first bushing and the second bushing wear less than 0.010 inches from the beginning of life state to the end of life state.

9. The steering assembly of claim 1, wherein the annular thrust bearing assembly consists of a sealed thrust bearing assembly having a plurality of rolling elements disposed between and rollingly engaging the first plate and the second plate.

10. The steering axle assembly of claim 9, wherein the rolling elements are tapered needle bearings.

11. The steering axle assembly of claim 9, wherein the rolling elements are manufactured from a metallic material.

* * * * *